Figure 6:
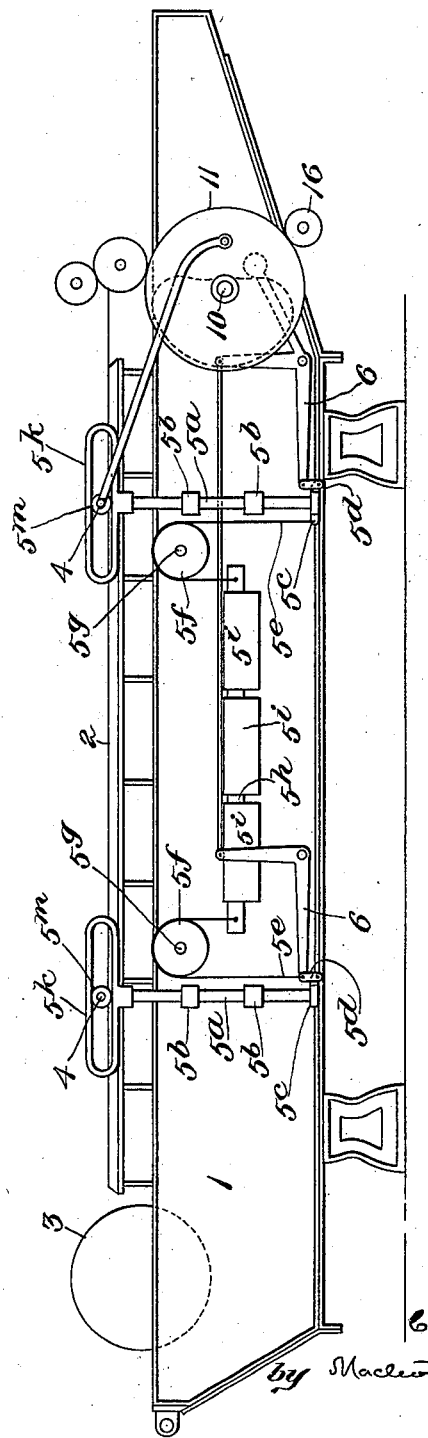

No. 687,073. Patented Nov. 19, 1901.
C. E. T. SCRIBNER.
WOOL WASHER.
(Application filed Mar. 11, 1901.)
(No Model.) 2 Sheets—Sheet 1.
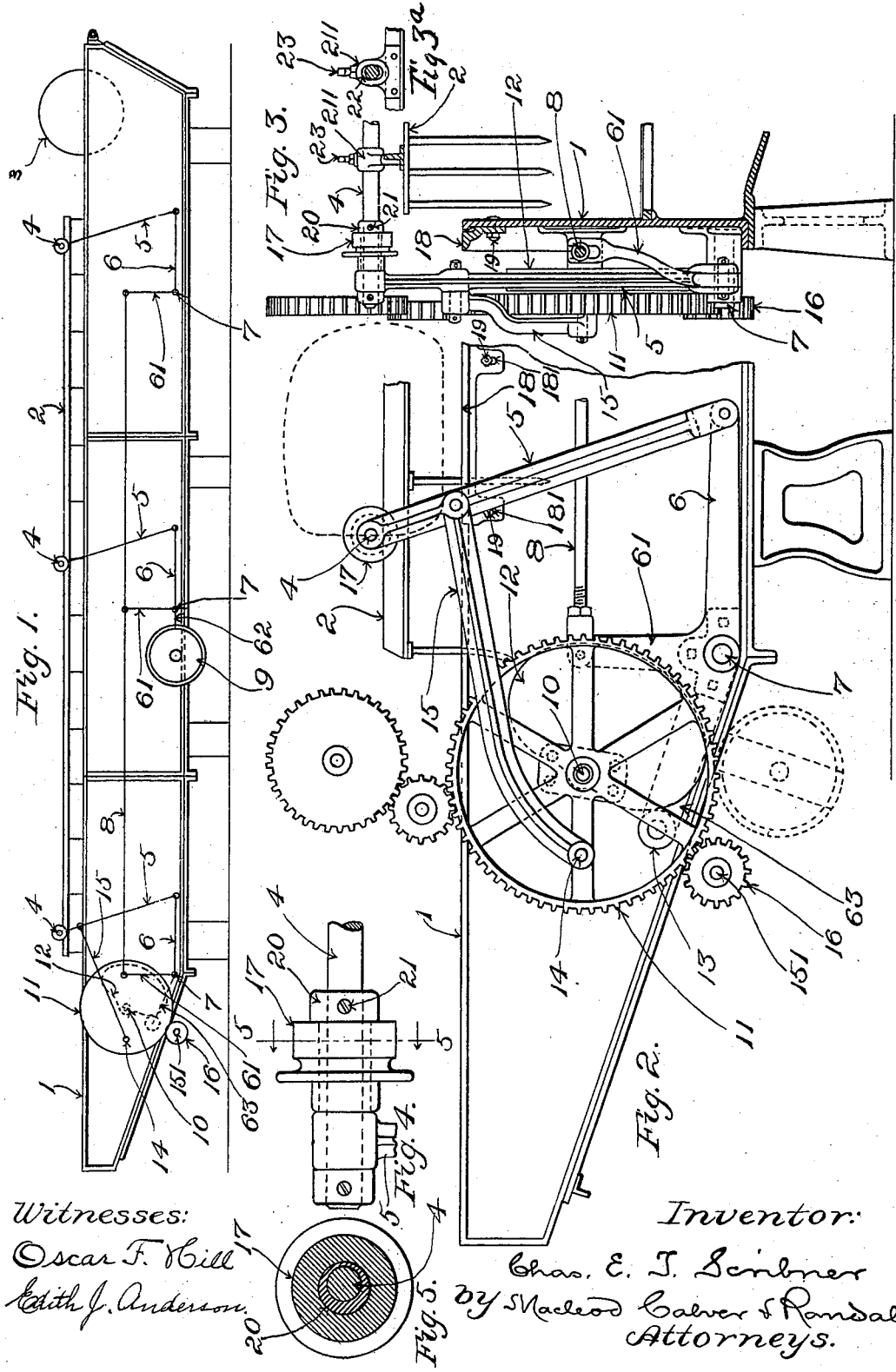
Witnesses:
Oscar F. Hill
Edith J. Anderson.
Inventor:
Chas. E. T. Scribner
by Macleod Calver & Randall
Attorneys.

No. 687,073. Patented Nov. 19, 1901.
C. E. T. SCRIBNER.
WOOL WASHER.
(Application filed Mar. 11, 1901.)
(No Model.) 2 Sheets—Sheet 2.

Witnesses:

Inventor:
Chas. E. T. Scribner
by Macleod Calver & Randall
Attorneys.

UNITED STATES PATENT OFFICE.

CHARLES EDWIN T. SCRIBNER, OF NORTH ADAMS, MASSACHUSETTS, ASSIGNOR TO JAMES HUNTER MACHINE COMPANY, OF NORTH ADAMS, MASSACHUSETTS, A CORPORATION OF MASSACHUSETTS.

WOOL-WASHER.

SPECIFICATION forming part of Letters Patent No. 687,073, dated November 19, 1901.

Application filed March 11, 1901. Serial No. 50,585. (No model.)

*To all whom it may concern:*

Be it known that I, CHARLES EDWIN T. SCRIBNER, a citizen of the United States, residing at North Adams, in the county of Berkshire, State of Massachusetts, have invented a certain new and useful Improvement in Wool-Washers, of which the following is a specification, reference being had therein to the accompanying drawings.

The invention has reference more especially to the means for supporting and operating the rake or harrow by means of which the wool is caused to travel from the feeding end of the bowl of a wool-washer to the discharging end of the said bowl.

The invention consists in the improved combination of devices, which I will now proceed to describe with the aid of the accompanying drawings, in which latter are illustrated two embodiments of the invention.

In the drawings, Figure 1 is a view on the order of a diagram, showing portion of a wool-washer with one embodiment of the invention applied thereto. Fig. 2 is a side elevation, on an enlarged scale, of the parts at the left-hand end of Fig. 1. Fig. 3 is a view on the order of a transverse section looking from the right-hand side in Fig. 2. Fig. 3ᵃ is a detail view looking from the right-hand side in Fig. 3. Fig. 4 is a detail view in elevation, showing the end portion of one of the cross-rods and the parts which are connected therewith. Fig. 5 is a sectional detail view, the plane of section being indicated by the dotted line 5 5 in Fig. 4. Fig. 6 is a side elevation of a wool-washer having applied thereto a second embodiment of the invention.

Having reference to the drawings, and more especially to Figs. 1 to 5 thereof, 1 designates the bowl or tank of a wool-washer. 2 is the rake or harrow working in the said bowl or tank. 3, Fig. 1, is the rotary ducker that is employed at the feeding or receiving end of the bowl or tank. The foregoing parts may be of any approved character and construction, and the remaining parts (not shown) may be as usual in the art or as preferred.

At intervals the rake or harrow 2 has connected therewith cross-rods 4, one of which is represented in Figs. 2 and 3. The ends of the said cross-rods project laterally beyond the sides of the bowl. The said ends are fitted to eyes in the upper ends of side arms or links 5, each cross-rod being thus connected with a pair of the said side arms or links. The number of cross-rods and pairs of side arms or links employed in practice will vary with the length of the bowl and rake or harrow. Fig. 1 shows a rather long machine, in which three cross-rods and pairs of side arms or links are employed. In the case of a shorter machine only two cross-rods and pairs of side arms or links would be required. Each side arm or link 5 is pivoted at its lower end to the horizontal arm 6 of a lever which is mounted pivotally upon a stud 7, projecting from the exterior of the bowl. Each of the said levers has an upwardly-extending arm 61, and the arms 61 of all the levers on each side of the bowl are connected together by a rod or rods 8, so as to compel all of the levers to move in unison.

The weight of the rake or harrow is more or less completely counterbalanced by means of weights 9, applied to arms 62, with which the levers of one or more pairs of the side arms or links 5 are provided, the said arms 62 projecting oppositely with respect to the arms 6 of the said levers.

I provide as follows for the actuation of the rake or harrow and for causing it to move through the predetermined path in its working: At 10 is a stud projecting from the exterior of the bowl or tank, adjacent to one end of the latter. 11 designates a gear-wheel mounted to rotate on the said stud, and 12 is a cam at the side of the gear 11, fixedly connected with the latter and rotating in unison therewith. The acting face of the said cam engages with the roller 13, mounted on a stud carried by the arm 63 of the adjacent lever, arm 63 projecting oppositely with reference to arm 6 of the said lever. A crank-pin 14, carried by the gear 11, is connected by a rod 15 with the adjacent side arm or link 5. The rake supporting and actuating arrangements are duplicated at the opposite sides of the bowl, there being at each side of the bowl a series of side arms or links and their levers, a rod or rods connecting said levers together, one or more counterbalances, a cam, a gear with its crank-pin, and a rod connecting said crank-pin with the adjacent side arm or link. For the purpose of causing the gear and cam at one side of the bowl to rotate in unison with the gear and cam at the other side thereof a cross-shaft 151 is provided, it carrying pinions 16, meshing with the respective gears. This cross-shaft may be employed as a driving-shaft for the said gears and cams, if desired; or, if preferred, other driving means may be employed. The crank-pins 14 transmit to the rake or harrow through the rods 15 movement in the direction of the length of the bowl, while the cams 12 act through the lever arrangements described to control the position of the rake or harrow vertically as it travels. The cams may be shaped to coöperate with the cranks in causing the rake or harrow to follow any desired predetermined path of movement. Preferably the said path is approximately as indicated by the dotted-line diagram in Fig. 2. In the case of the illustrated mechanism the rake or harrow is caused to advance horizontally while its tines are immersed in the contents of the bowl, then rise nearly vertically at the extreme of its advancing movement, then return along a substantially horizontal slightly-curved course, and then descend in a nearly vertical curved course.

In some cases the cross-rods 4 may be provided with rolls 17 adjacent the ends of such rods to rest and move during the advance of the rake or harrow upon the upper surfaces of the sides of the bowl, or, what is better, upon short sections of tracks 18, secured to the said sides. By forming these sections with vertical slots 181 181 for the bolts 19 19, which secure the same to the sides of the bowl, the said sections may be adjusted vertically to locate their upper surfaces at the required height. The rolls 17 are also mounted upon the cross-rods 4, with capacity for vertical adjustment relative to the said cross-rods. Thus each roll 17 revolves upon the exterior of an eccentric bushing 20, mounted upon the cross-rod 4 and made fast thereon in the required position by means of a suitable securing device, herein constituted by a clamping-screw 21. By loosening the screw 21, turning the bushing around the axis of the cross-rod to the required extent, and again tightening up the clamping-screw the bushing may be set to give the roll 17 the required vertical adjustment or shift relative to the cross-rod 4.

For the purpose of enabling the rake or harrow to be adjusted vertically upon the cross-rods 4 each cross-rod has fitted thereto hangers or brackets 211, which are attached to the rake or harrow. These hangers are formed with vertically-elongated eyes or loops 22, through which the cross-rods pass. Adjusting-screws 23 are applied to the upper portions of the said eyes or loops, their lower ends resting upon the cross-rods. By turning the said screws in or out more or less the required adjustment of the rake or harrow relative to the cross-rods is effected.

As will be apparent, the vertical components of the movement of the rake or harrow are derived from the cam 12, while the horizontal components of the said movement are derived from the crank 14. The burden of sustaining the rake or harrow and imparting vertical movements thereto devolves wholly upon the cam, and the crank is relieved therefrom. The connections are direct and simple, and the possibilities of wear are minimized.

Fig. 6 shows a modified embodiment of the invention, in which the pivoted side arms or links 5 of Figs. 1, 2, and 3 are replaced by side bars $5^a$, mounted to slide vertically through guides at $5^b$, applied to the side of the bowl. Collars $5^c$, attached to the lower ends of the said side bars $5^a$, are connected by links $5^d$ with the arms 6 of the cam-operated levers. Flexible connections $5^e$, connected directly or indirectly with the said collars $5^c$, or otherwise connected with the side bars, extend over pulleys or sheaves $5^f$, mounted on studs $5^g$, projecting outwardly from the sides of the bowl. These flexible connections are joined to the bar $5^h$, carrying the weights $5^i$, designed to more or less completely counterbalance the weight of the rake or harrow and said side bars. The upper ends of the side bars $5^a$ are in sliding connection with the rake or harrow, so as to provide for horizontal movement of the rake or harrow relative to the side bars. In the present case a slotted guide $5^k$ on the upper end of each side bar is arranged to receive a roll $5^m$ carried by each cross-rod 4, as shown in Fig. 6. In this embodiment of the invention the use of fixed tracks on the sides of the bowl for the support of the rake or harrow during its horizontal advancing movement, as in Figs. 1 to 5, is dispensed with, and the support of the rake or harrow throughout its entire traverse is furnished by the cams.

I claim as my invention—

1. In a wool-washer, in combination, the bowl, the rake or harrow, the side arms with the upper ends of which the rake or harrow is connected pivotally, the levers with which the lower ends of the said side arms are connected pivotally, the rod or rods connecting said levers to move in unison, the connecting-rod pivoted to one of said side arms at an intermediate point, the rotating cam acting upon one of the said levers, and the crank rotating in unison with the said cam upon the same axis, substantially as described.

2. In a wool-washer, in combination, the bowl, the rake or harrow, the side arms with which the rake or harrow is connected pivotally, the lever system with which the said side arms are connected, the rotating cam coacting with one of the said levers, the crank operatively connected with the said rake or harrow to produce longitudinal movement thereof, fixed tracks, and vertically-adjustable rollers carried by the said rake or harrow for contact with said fixed tracks, substantially as described.

3. In a wool-washer, in combination, the bowl, fixed tracks at the side thereof, the rake or harrow, the cross-rods connected therewith, the eccentric bushings applied to the said cross-rods, the rollers mounted on the said eccentric bushings for coöperation with said tracks, and means connected with said cross-rods for occasioning the movements of the rake or harrow vertically and longitudinally with reference to the bowl, substantially as described.

4. In a wool-washer, in combination, the bowl, the rake or harrow, side supports for the said rake or harrow, the lever system with which said side supports are connected, the rotating cam coacting with one of the levers of the said lever system to occasion the vertical components of the movement of the rake or harrow, and the crank rotating in unison with the said cam upon the same axis and operatively connected to occasion the horizontal components of the movement of the rake or harrow, substantially as described.

In testimony whereof I affix my signature in presence of two witnesses.

CHARLES EDWIN T. SCRIBNER.

Witnesses:
H. E. WETHERBEE,
W. H. McNEILLY.